W. E. OSTER & S. TEMPINSKI.
PIPE COUPLING.
APPLICATION FILED JULY 7, 1914.
1,154,540.
Patented Sept. 21, 1915.
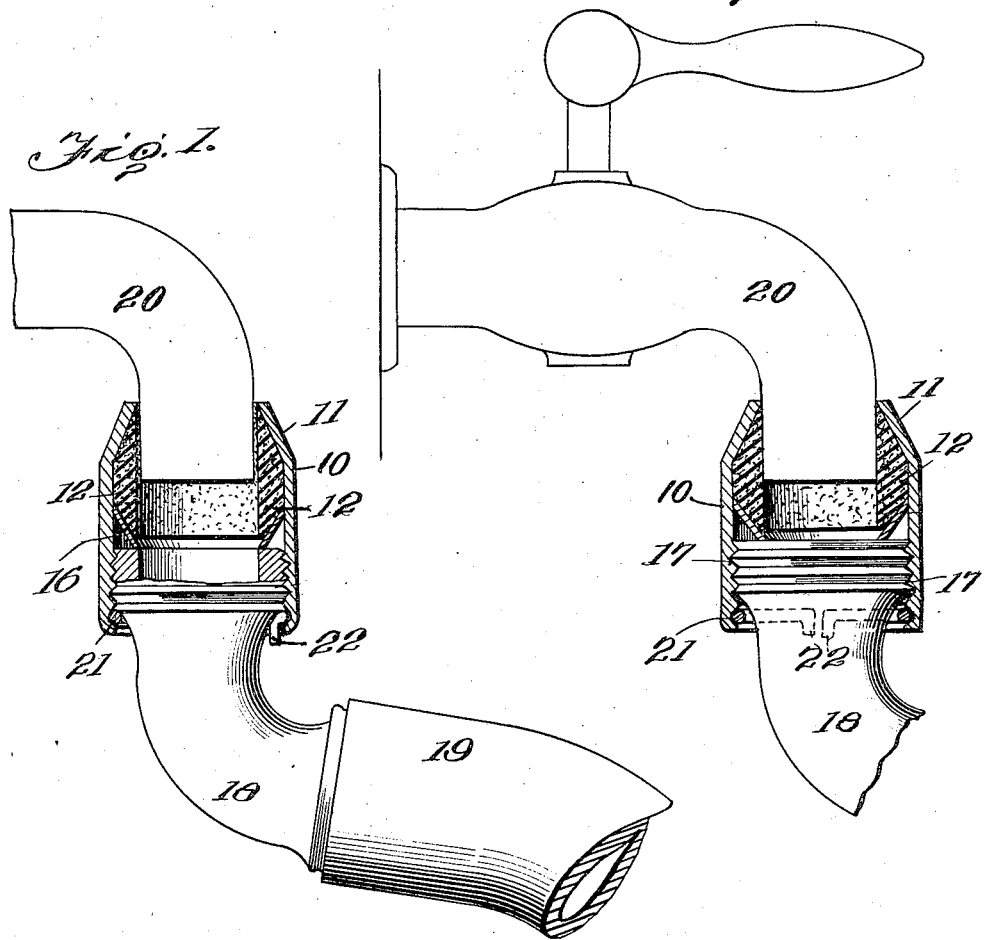
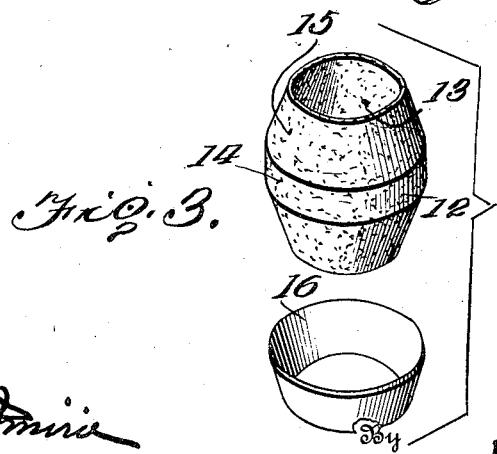

UNITED STATES PATENT OFFICE.

WALTER E. OSTER AND STANISLAW TEMPINSKI, OF CHICAGO, ILLINOIS.

PIPE-COUPLING.

1,154,540.

Specification of Letters Patent.  Patented Sept. 21, 1915.

Application filed July 7, 1914. Serial No. 849,499.

*To all whom it may concern:*

Be it known that we, WALTER E. OSTER and STANISLAW TEMPINSKI, citizens of the United States, residing at Chicago, in the county of Cook and State of Illinois, have invented certain new and useful Improvements in Pipe-Couplings, of which the following is a specification.

This invention relates to pipe couplings particularly adapted for attachment to the ordinary faucet, the device being adapted to engage the smooth free extremity of the faucet to form a tight joint.

The invention has as its primary object to provide a device of this character which may be used in connection with faucets of various diameters and wherein the coupling may be positioned upon the outer extremity of the faucet and then clamped down to form a tight joint.

A further object of the invention is to provide a pipe coupling composed of few and simple parts and wherein the parts may be readily assembled and disassembled.

A further object of the invention is to provide a pipe coupling wherein the rubber gasket employed is protected from wear or abrasion in the adjustment of the parts.

With these and other objects in view our invention will be more fully described illustrated in the accompanying drawings and then specifically pointed out in the claims which are attached to and form a part of this application.

In the drawing, Figure 1 is a longitudinal sectional view showing the coupling attached to a faucet, the parts being shown in position before being clamped down to engage the faucet, the extremity of the faucet and the elbow being shown in perspective, Fig. 2 is a similar view, showing the parts of the coupling in engaged position, and Fig. 3 is a detail perspective view of the gasket employed and the bearing ring, the parts being shown disassembled but in proper relation.

Corresponding and like parts are referred to in the following description and indicated in all the views of the drawing by the same reference characters.

Our improved coupling includes a shell 10 which is preferably cylindrical throughout the greater portion of its length and is contracted at one extremity, being frusto-conical in formation at this end as shown at 11. The shell 10 is preferably formed of suitable metal and may, of course, be made any desired diameter, the bore thereof being large enough, of course, to receive the free extremity of the ordinary faucet.

Fitting within the shell 10 is a gasket 12 which may be formed of any suitable material and which is provided with a central bore 13 of a diameter sufficiently large to receive the free extremity of the ordinary faucet. The gasket 12 upon its outer face and midway the ends thereof, is preferably provided with a straight wall 14, disposed to bear against the straight wall of the shell 10 so that the gasket may move freely longitudinally therein, and is cut away adjacent its extremities to provide oppositely inclined beveled faces 15, the gasket being substantially frusto-conical in formation adjacent the ends thereof.

As shown in Figs. 1 and 2 of the drawings, when the gasket is positioned within the shell 10, one of the beveled faces 15 thereof will bear against the similarly inclined walls of the contracted upper extremity 11 of the shell, and fitting over the lower extremity of the gasket is a bearing ring 16 shown in detail in Fig. 3 of the drawings. The bearing ring 16 may be formed of metal or any other suitable material and is substantially cup-shaped as shown, being provided with parallel inner and outer walls which converge toward one edge of the ring. By this construction, it will be observed that the bearing ring 16 is adapted to fit over the lower extremity of the gasket 12 to bear by its inclined walls against the adjacent inclined face 15 of the gasket.

The shell 10 is interiorly screw threaded adjacent its outer extremity as shown at 17 and is designed to engage one extremity of an elbow or other suitable pipe section, conventionally shown at 18, to the outer extremity of which a hose 19 or other pipe, may be secured. In Fig. 1 of the drawings, we have shown the gasket in position upon the free extremity of the faucet bib, conventionally shown at 20, and prior to being adjusted to engage the bib, and it will be observed that the coupling may be readily applied by inserting the adjacent extremity of the bib within the gasket 12 as shown. Particular attention is now called to the means by which the coupling is caused to engage the adjacent extremity of the bib. After adjusting the coupling, as shown in Fig. 1 of the drawings, the shell 10 may be manually rotated about the adjacent extremity of the pipe coupling 18, or the shell may be maintained stationary and the said coupling turned to cause the inner extremity thereof to advance inwardly of the shell into engagement with the bearing ring 16 which in turn will be forced up against the adjacent inclined face 15 of the gasket. As will be clear, the gasket will also thus be moved upwardly within the shell to cause the upper inclined face 15 thereof to be engaged by the adjacent inclined walls of the shell 10 which will force the adjacent extremity of the gasket inwardly into frictional engagement with the extremities of the bib, a similar action being exerted upon the lower extremity thereof by the bearing ring 16 which engaging against the lower inclined face of the gasket will act to move the lower extremity thereof inwardly to thus bring the wall of the bore 14 of the gasket into close contact with the portion of the bib disposed within the gasket throughout its entire length.

It will thus be seen that by this construction the coupling may be attached to faucet bibs having smooth outer walls in such a manner that a tight connection will be provided, and to overcome any possibility of the pipe coupling 18 turning within the shell 10 after the coupling is attached to a faucet, in the practical use of the device, we provide a resilient split locking ring 21. The locking ring 21 may be formed of wire or any suitable material and is of a relative diameter to engage within the threaded portion of the shell 10 exteriorly of the threaded portion of the pipe coupling 18 as shown in Figs. 1 and 2 of the drawings, the said ring being preferably provided with terminal lugs 22 by which it may be readily grasped.

In Fig. 2 of the drawings, we have shown the coupling applied in operative position with the gasket 12 forced into engagement with the adjacent extremity of the faucet bib in the manner above described and it will be observed that when the locking ring 21 is rotated within the threaded portion of the outer extremity of the shell 10, to engage the adjacent lower face of the contiguous extremity of the pipe section 18, that any turning movement of said pipe section within the shell is prevented thereby, such as would relieve the compression upon the gasket 12 brought about through being clamped between the outer inclined walls of the contracted portion 11 of the shell and the bearing ring 16. Any possibility of the accidental displacement of the coupling from the faucet bib, in use, or the loosening thereof such as would result in allowing water to escape at the coupling, is prevented, and obviously this is a decided feature of advantage where the coupling is to be used in connection with a hose and when the user cannot have ready access to the coupling. Attention is also called to the fact that the bearing ring 16 acts to protect the adjacent extremity of the gasket from wear or injury which might otherwise be brought about when adjusting the pipe coupling 18 within the shell 10 since the adjacent extremity of the pipe coupling will rotate against the bearing ring and will at no time be caused to come into contact with the gasket.

It will therefore be seen that we provide a very simple and efficient structure for the purpose set forth having few parts which may be readily assembled or disassembled. It will also be noted that the coupling can be easily applied and that the gasket employed is protected from injury when adjusting the device.

Having thus described our invention, what we claim and desire to secure by Letters Patent is:—

1. A device of the character described including a shell formed with a substantially frusto conical wall at one extremity thereof, a gasket arranged within the shell and provided with substantially frusto conical walls adjacent its opposite extremities, one of said walls being adapted to contact with the similarly inclined wall of the shell, a bearing ring having a substantially frusto conical wall arranged to engage the other similarly inclined wall of the gasket, and a pipe section connected to the shell and arranged to engage said bearing ring.

2. A device of the character described including a shell, a gasket arranged within the shell, a bearing ring disposed to engage the gasket, a pipe section screw threaded to engage the shell and arranged to engage said bearing ring, and a locking ring freely connected with the screw threads of the shell and arranged to engage said pipe section upon one side of the screw threads thereof.

3. A device of the character described including a frusto conical shell internally screw threaded adjacent its larger end, a centrally bored gasket fitting within the shell, said gasket being provided medially with a straight circumferential wall seating against the wall of the body of the shell and being further provided with frusto conical ends one engaging within the frusto conical end of the shell, a substantially frusto conical bearing ring seating against the other frusto conical end of the gasket, and an externally screw threaded pipe section fitting within the screw threaded extremity of the shell and engaging said bearing ring.

In testimony whereof we affix our signatures in presence of two witnesses.

WALTER E. OSTER. [L. S.]
STANISLAW TEMPINSKI. [L. S.]

Witnesses:
STANS ELLINGSON,
JOHN FURENKO.